United States Patent
Powell

(10) Patent No.: US 12,169,772 B1
(45) Date of Patent: Dec. 17, 2024

(54) APPARATUS AND METHODS FOR AUTOMATED MENTORSHIP USING MACHINE-LEARNING PROCESSES

(71) Applicant: TES FRANCHISING, L.L.C., Southbury, CT (US)

(72) Inventor: Terry Powell, Southbury, CT (US)

(73) Assignee: TES FRANCHISING, L.L.C., Southbury, CT (US)

( * ) Notice: Subject to any disclaimer, the term of this patent is extended or adjusted under 35 U.S.C. 154(b) by 0 days.

(21) Appl. No.: 18/588,245

(22) Filed: Feb. 27, 2024

(51) Int. Cl.
*G06N 3/00* (2023.01)
*G06N 3/0464* (2023.01)

(52) U.S. Cl.
CPC .................. *G06N 3/0464* (2023.01)

(58) Field of Classification Search
CPC ...... G06K 15/1885; G06N 3/126; G06N 5/01; G06N 5/013; G06N 5/02; G06N 5/025; G06N 3/0464
See application file for complete search history.

(56) References Cited

U.S. PATENT DOCUMENTS

| | | | |
|---|---|---|---|
| 10,311,529 B1 | 6/2019 | Noel | |
| 11,507,907 B2 | 11/2022 | Chauhan | |
| 2022/0147896 A1 | 5/2022 | Schoeffer | |
| 2023/0011954 A1 | 1/2023 | Elserafy | |
| 2023/0048437 A1* | 2/2023 | Karbasi | H04L 67/535 |

* cited by examiner

*Primary Examiner* — Ping Y Hsieh
(74) *Attorney, Agent, or Firm* — Caldwell Intellectual Property Law

(57) ABSTRACT

An apparatus and method for automated mentorship using machine-learning is disclosed. The apparatus comprises at least a processor configured to receive a user profile from a user with at least an object enablement datum, convert the profile to a digital model by applying at least one classifier descriptor data tag, generate a programmed outline for the at least an object enablement datum with a plurality of action data based on the digital model using machine-learning processes, determine at least an action datum from the plurality of action data within the programmed outline using a heuristic model, direct the user to a plurality of appropriate resources, and display the programmed outline and the plurality of object enablement datum resources for the user.

18 Claims, 8 Drawing Sheets

APPARATUS AND METHODS FOR AUTOMATED MENTORSHIP USING MACHINE-LEARNING PROCESSES

FIELD OF THE INVENTION

The present invention generally relates to the field of machine-learning. In particular the present invention is directed to an apparatus and method for automated mentorship using machine-learning processes.

BACKGROUND

Generation of specialized information sets is generally computationally intensive and/or inaccurate. The alternative, additional data inputs, is often unavailable, and wasteful when present.

SUMMARY OF THE DISCLOSURE

In an aspect, an apparatus for automated mentorship based on machine-learning processes. The apparatus includes at least a processor configured to receive a user profile from a user, wherein the user profile comprises at least an object enablement datum, convert the profile to a digital model by applying at least one classifier descriptor data tag, generate a programmed outline for the at least an object enablement datum with a plurality of action data based on the digital model using a machine-learning process, determine at least an action datum from the plurality of action data within the programmed outline using a heuristic model, direct the user to a plurality of object enablement resources as a function of the determined at least an action datum and the programmed outline, and display the programmed outline and the plurality of object enablement resources for the user.

In a separate aspect, a method for automated mentorship based on machine-learning processes. The method includes receiving, by the at least a processor, a user profile from a user wherein the user profile comprises at least an object enablement datum, converting, by the at least a processor, the profile to a digital model by applying at least one classifier descriptor data tag, generating, by the at least a processor, a programmed outline for the at least an object enablement datum with a plurality of action data based on the digital model using a machine-learning process, determining, by the at least a processor, at least an action datum from the plurality of action data within the programmed outline using a heuristic model, directing, by the at least a processor, the user to a plurality of object enablement resources as a function of the determined at least an action datum and the programmed outline, and displaying the programmed outline and the plurality of object enablement resources for the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
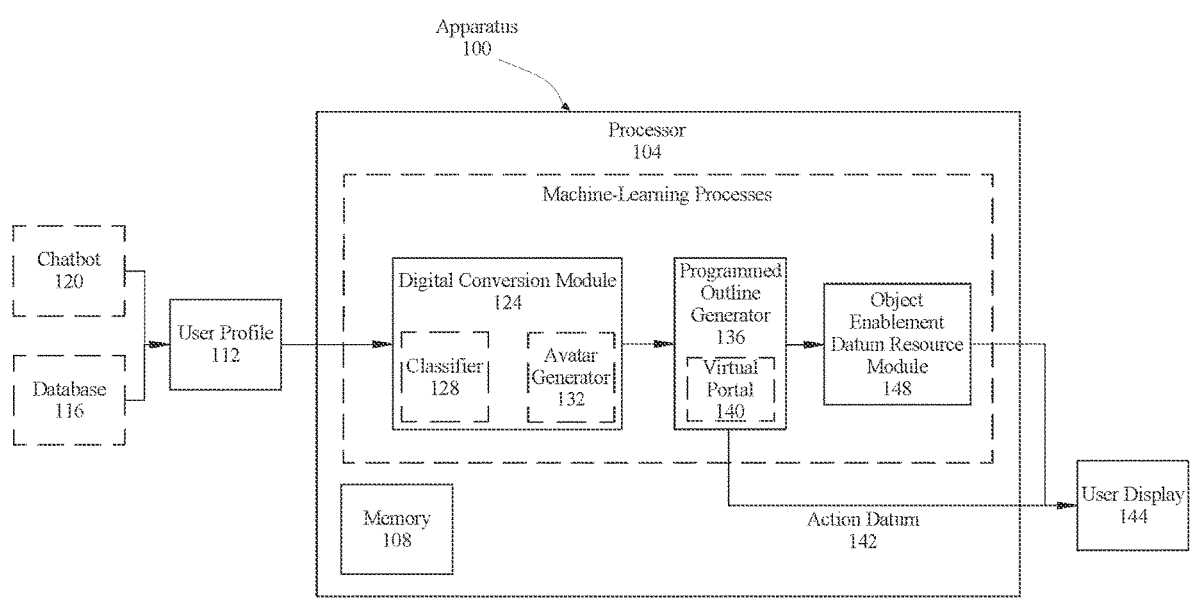
FIG. 1 is a diagram of a system automated mentorship using machine-learning processes.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus for automated mentorship based on machine-learning processes. The apparatus includes at least a processor configured to receive a user profile from a user, wherein the user profile comprises at least an object enablement datum, convert the profile to a digital model by applying at least one classifier descriptor data tag, generate a programmed outline for the at least an object enablement datum with a plurality of action data based on the digital model using a machine-learning process, determine at least an action datum from the plurality of action data within the programmed outline using a prioritized heuristic mathematical model, direct the user to a plurality of object enablement resources as a function of the determined at least an action datum and the programmed outline, and display the programmed outline and the plurality of object enablement resources to the user. In one or more embodiments, the present disclosure utilizes heuristic models to generate results, such as action datum using limited information. In one or more embodiments, the present disclosure allows for increase computational efficiency by using heuristic models to limit the number of resources needed to perform computational tasks; this reduces both clock cycles and memory requirements for computer systems. For instance a heuristic model can perform each cycle of training and/or computation when deployed using fewer instructions and with a smaller memory set. This in turn permits more rapid convergence in training, and in deployment increases the likelihood that memory needs can be performed with cache or register retrievals. The latter increases the ability to use portable, low-power computing, increasing drastically the forms and modes of deployment in, for instance embedded computing. Lower clock cycles and memory also decrease power needs, permitting use of lower-power devices and devices with lower clock speeds. As a result, systems using heuristic models may. In one or more embodiments, the present disclosure allows for increased efficiency and accuracy in the generation of outputs such as action datum. In one or more embodiments, heuristic models may be used to generate and/or select results that are proximal to a desired result, while still preserving computational efficiency.

In a separate aspect, the present disclosure is directed to a method for individualized, automated instruction based on machine-learning processes. The method includes receiving, by the at least a processor, a user profile from a user wherein the user profile comprises at least an object enablement datum, converting, by the at least a processor, the profile to a digital model by applying at least one classifier descriptor data tag, generating, by the at least a processor, a programmed outline for the at least an object enablement datum with a plurality of action data based on the digital model using a machine-learning process, determining, by the at least a processor, at least an action datum from the plurality of action data within the programmed outline using a prioritized heuristic mathematical model, directing, by the at least a processor, the user to a plurality of appropriate resources, and displaying the programmed outline and the plurality of object enablement resources for the user.

Referring now to FIG. 1, an exemplary embodiment of apparatus 100 and an individualized automated instruction using machine-learning processes is illustrated. Apparatus 100 includes a processor 104. Processor 104 may include, without limitation, any processor described in this disclosure. Processor may be included in a computing device. Apparatus 100 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any step, or sequence of steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Computing devices are discussed in detail in reference to FIG. 8 below.

Still referring to FIG. 1, processor 104 is configured by a communicatively connected memory 108. Memory 108 is communicatively connected to the processor 104. Processor 104 is configured to receive a user profile 112 from a user wherein the user profile comprises at least an object enablement datum. As used herein, "object enablement datum" refers to a user-defined goal or conclusion. In some cases, user may include an individual, a group of individuals, a team, a small business, a company, an enterprise, or the like. As used herein, a "user profile" is a compilation of a data relevant to the specified object enablement datum which supports user's goals and operations. In a non-limiting embodiment, user profile 112 may include data describing a plurality of franchises user aspires to open and run wherein the object enablement datum would refer to the franchise establishment. In some cases, user profile 112 may include one or more data elements describing the type of franchise, investment requirements, property locations, resource needs, personnel and manning essentials, support, and any other topics and material which a successful franchisee may find helpful in the considerations around starting up a franchise. In a non-limiting example, user profile 112 may include the goals of an aspiring software engineer, which may further include the coding platforms user hopes to learn to program within and the cost and materials affiliated with the accepted best path to gaining the expertise within the specified platforms.

Still referring to FIG. 1, user profile 112 may be a historical user profile saved within a database 116. Processor 104 may be communicatively connected to a database 116. For example, database 116 may be configured as a structured database with contents organized according to a schema or other logical relationships (e.g., relational database). In some embodiments database 116 may be configured as a non-relational database, a semi-structured database, an unstructured database, a key-value store, or the like. Although database 116 is depicted as being coupled directly to user profile 112, a variety of other arrangements are possible. For example, and without limitation, database 116 may be stored in memory 108, accessed via a network, or the like. Database 116 may be used to store historical data, prior object enablement data by the initial user or past object enablement data by other users, or any other data which may be relevant and/or applicable in subsequent applications. Database 116 may be implemented, without limitation, as a relational database, a key-value retrieval database such as a NOSQL database, or any other format or structure for use as a database that a person skilled in the art would recognize as suitable upon review of the entirety of this disclosure. Database 116 may alternatively or additionally be implemented using a distributed data storage protocol and/or data structure, such as a distributed hash table or the like. Database 116 may include a plurality of object enablement data, data entries, and/or records as described above. Data entries in a database may be flagged with or linked to one or more additional elements of information, which may be reflected in data entry cells and/or in linked tables such as tables related by one or more indices in a relational database. According to some embodiments, processor 104 may access a plurality of user profiles by downloading them from other communicatively connected devices. User profiles 112 may be sourced from an anonymized, online database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, receiving user profile 112 may include interfacing with the user using a chatbot 120 to collect the required data, as determined by a decision tree progression, and populating that required data within user profile 112 as part of a digital conversion process. As used in this disclosure, a "decision tree" is a data structure that represents and combines one or more determinations or other computations based on and/or concerning data provided thereto, as well as earlier such determinations or calculations, as branches of a tree data structure where inputs of some branches are connected to outputs of others. As used in this disclosure, a "branch" of a tree is an entity which contains a value or data and optionally contains one or more connections to other branches. Plurality of branches within decision tree has at least a root branch, or branch that receives data input to the decision tree, corresponding to a data collection. Plurality of branches within decision tree has at least a terminal branch, which may alternatively or additionally be referred to herein as a "leaf," corresponding to an execution result of decision tree. In other words, decisions and/or determinations produced by decision tree may be output at the at least a leaf. In a non-limiting embodiment, user may identify the first branch by selecting an object enablement type such as restaurant, delivery service, cleaning service, mobile food truck, or other similar endeavors covered within apparatus 100. Once user selects a branch, for example a delivery service, chatbot 120 may present a series of sub-branches to choose from depending on the type of delivery. Once the delivery type is selected, processor 104 may advance to a subordinate branch of the decision tree to begin a planning assessment to further identify the resource needs and steps to begin the delivery service. Chatbot 120 may enable a complete assembly of user profile 112 by starting with foundational information and building out user profile 112 as the critical information is revealed. Critical information may be identified and known based on the type of object enablement user selects, or processor 104 may rely on machine-learning processes to identify the forms and process steps that will be required, then prompt the user to provide the requisite details for those forms or process steps. Chatbot 120 may also be used to support finalizing user profile 112 where critical information is missing, unclear, or erred. Chatbot 120 may engage user based on a decision tree structure wherein a set of binary and/or multiple choice questions are initially posed until short or extended responses become the more efficient method of information transfer. In a non-limiting embodiment, chatbot 120 may, in coordination with processor 104, communicate to user that a middle initial is required and missing precluding a proper filing of a required form, wherein chatbot may ask the user for the applicable middle initial. Chatbot 120 may request any data independently or may provide a brief explanation for the request. Chatbot operations are discussed in detail below in reference to FIG. 3.

Still referring to FIG. 1, chatbot 120 may use a language processing module within a digital conversion module 124. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways, Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, the language processing module may operate to produce a language processing model. Language processing model may include a program automatically generated by a language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at processor 104, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between extracted words, phrases, and/or other semantic units. There may be a finite number of categories to which an extracted word may pertain: an 1-MM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into apparatus 100 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, in cases where any or all of user profile 112 contains images text, processor 104 may utilize an optical character recognition or optical character reader (OCR), executed by circuitry to automatically convert images of written (e.g., typed, handwritten or printed text) into machine-encoded text. In some cases, recognition of at least a keyword from an image component may include one or more processes, including without limitation OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, OCR feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2 below. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Figure 2:
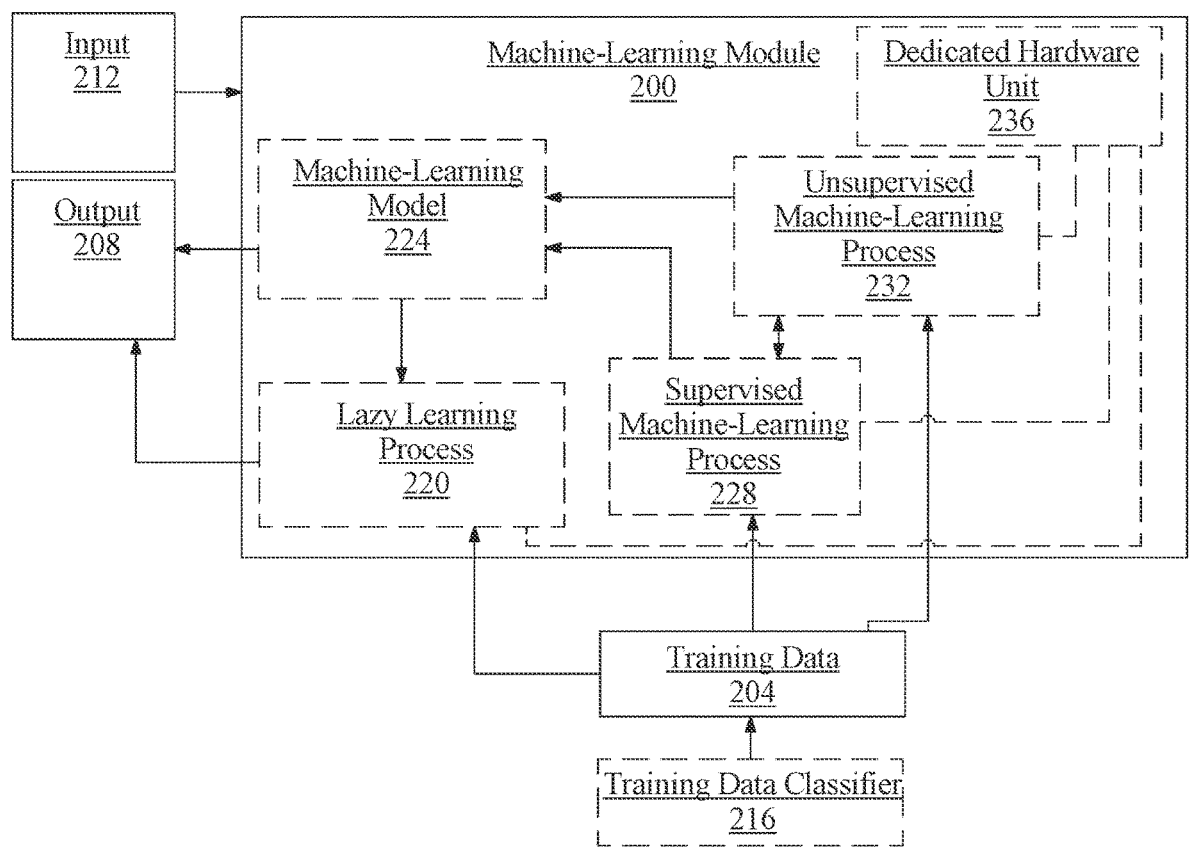
FIG. 2 is a block diagram of an exemplary machine-learning process.

Still referring to FIG. 2, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, processor 104 is configured to convert the user profile 112 to a digital model by applying at least one classifier descriptor data tag. As used within this disclosure, a "digital model" is a computerized, data model of an object or system that captures and represents all the necessary data associated with that object or system in a digital environment. A "digital environment," for the purpose of this disclosure is an integrated communications environment where digital devices communicate and manage data and interactions within the digital environment. Digital device may be any computing device as described in this disclosure, for example as described in FIG. 8. For example, the digital environment may be one of a computer system, computer network, and the like. In an exemplary embodiment, the digital environment may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In some embodiments, the digital environment may also include any electronically based asset associated with the digital environment, as described in this disclosure. For example, electronically based digital assets may be computer programs, data, data stores, and the like, but are not limited to such examples. The digital environment may be connected to processor 104 by a network. Digital environment may employ any type of network architecture. For example, the digital environment may employ a peer to peer (P2P) architecture where each computing device in a computing network is connected with every computing device in the network and every computing device acts as a server for the data stored in the computing device. In a further exemplary embodiment, the digital environment may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, the digital environment may employ a mesh topology where a computing device is connected to one or multiple other computing devices using point to point connections. However, the network topology is not limited thereto. One skilled in the art will recognize the various network architectures that may be employed by the digital environment.

Still referring to FIG. 1, importing of user profile 112 may contain personal information needing additional security protection. To add a layer of security, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Still referring to FIG. 1, a digital conversion module 124 is used to execute the conversion of the user profile 112 to a digital model. As used herein, "digital conversion module" refers to a software application which translates the human-readable information contained within user profile 112 into a machine-readable representation of the data contained therein. As used herein, "classifier descriptor data tags" refers to a plurality of digitally embedded labels which capture the human-readable information and append a machine-readable summary of that information to the digital model. Digital conversion module 124 may rely on machine-learning processes as a classifier 128 to append classifier descriptor data tags to the digital model, individual parts of the model, or identified clusters of model characteristics as contained within user profile 112. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. KNN algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, effective digital conversion may rely on training data from past user object enablement data, or from the current user object enablement datum in the form of direct feedback by user. Processor 104 may use user feedback to train the machine-learning models and/or classifiers described herein. For example, classifier 128 may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons, and used as described above. Accuracy score or another score as described above may indicate a degree of retraining needed for a machine-learning model such as a classifier; processor 104 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Digital conversion module 124 may employ a classifier module 128 to execute the application of classifier descriptor data tags to the digital profile. As used herein, a "classifier module" identifies the features of user profile 112 and compartmentalizes those features or groups of features under a set of affiliated classifier descriptor data tags. Classifier 128 may further associate those features or groups of features with individual classifier descriptor data tags. In a non-limiting embodiment, a user profile 112 which contains descriptions of an aspiring musical instrument store owner may be assigned, in a non-exhaustive manner, a set of classifier descriptor data tags containing "franchisee", "musical instruments", "single store", "start-up", "entry-level", "rentals", "modest workforce", and any other tags which would support the identification and optimization of a training plan. Application of classifier descriptor data tags may rely on fuzzy set matching to pair a classifier descriptor data tag to a user profile 112 or an individual part of a user profile 112. Fuzzy set application is discussed in detail in reference to FIG. 4 below.

Still referring to FIG. 1, processor 104 may be configured to generate a profile classifier using historical object enablement training data, wherein the historical object enablement training data comprises a plurality of historical object enablement data as input correlated to a plurality of classifier descriptor data tags as output. Alternatively, a plurality of artificially manufactured conversions of user profiles with properly appended classifier descriptor data tags may be used as training data. As used herein, "artificially manufactured" conversions refer to a set of human generated profiles which have already been affiliated with a set of classifier descriptor data tags. When ingested by processor 104, these pre-configured affiliations may be used as training data to bias the machine-learning processes in the way the user intends. User may import an infinite number of pre-configured profiles and classifiers to reduce the time to effectively train the machine-learning processes. Machine-learning processes may also rely exclusively on the user feedback from past object enablement data to train the machine-learning processes. Processor 104 is configured to next classify user profiles 112 and itemized portions of user profiles 112 into at least one classifier descriptor data tag using the profile classifier. This process of appending at least one classifier descriptor data tag to a user profile 112 enables the machine-learning processes to effectively analyze and process the user profile. To satisfactorily classify the user profile 112, a classifier descriptor data tag may be appended to each individual portion of a user profile 112 until all of the user profile 112 details are fully converted to a machine-readable format. Processor 104 is configured to append these classifier descriptor data tags to the digital model, individual parts of the model, or identified clusters of model characteristics. In a non-limiting embodiment, classifier 128 may compile several independent attributes of user profile 112 as a single classifier descriptor data tag (e.g. a potential franchisee is interested in a pizza establishment, a taco service, and a barbeque chicken joint may all be aggregated under a "restaurant franchisee" classifier descriptor data tag).

Still referring to FIG. 1, digital conversion module 124 may additionally employ an avatar generator module 132 to exploit user profile 112 and generate a representative user avatar. As used herein, "avatar generator" refers to an application which approximates a summary of user profile 112 through an assignment of a representative digital avatar. An "avatar," as used herein is an interactive character or entity in a virtual world. For example, a virtual avatar may include a base image consisting of a computer-generated image associated with the user/entity. The representative image may be an actual picture of the user or of any other real world image as selected by user. The representative image may additionally be modifiable by user. Avatar generator 132 may rely on a database of optional characters to choose from. This database may be the same as database 116, or separate so long as it is still communicatively connected to processor 104. Avatar generator 132 may additionally generate a unique avatar for each object enablement. In an embodiment, the generated avatar may include 3D modeling and/or animation software. In another embodiment, the generated avatar may be hosted in a decentralized platform (i.e., web 3.0). The generated avatar may be made of a "plurality of feature elements," which are, as used in this disclosure, diverse types of features from a virtual avatar such as image features, frame features, sound features, graphical features, and the like. After collecting user profile 112, processor 104 may generate a virtual avatar using avatar generator 132 by utilizing virtual avatar training data comprising information from a plurality of pre-existing virtual avatars from a virtual avatar database. In a non-limiting embodiment, avatar generator 132 may recognize that user profile 112 was assigned classifier descriptor data tags indicative of an aspiring pizza restaurant chain franchisee with aspirations of owning multiple franchises within an area in South Dakota, in which case avatar generator 132 may create an avatar made up of a heavyset cartoon bison wearing a chef's hat twirling a pizza on one hand. Avatar generator 132 may use a first feature learning algorithm and virtual avatar training data. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of user data items, as defined above, with each other and with virtual avatars. Processor 104 may perform a feature learning algorithm by dividing user data items from a given user into various sub-combinations of such data to create user data sets as described above and evaluate which user data sets tend to co-occur with which other user data sets, and virtual avatars. In an embodiment, first feature learning algorithm may perform clustering of data; for instance, a number of clusters into which data from training data sets may be sorted using feature learning may be set as a number of virtual avatars.

Still referring to FIG. 1, processor 104 is configured to generate a programmed outline for the at least an object enablement datum with a plurality of action data based on the digital model. In one or more embodiments, processor 104 may be configured to generate a programmed outline for the at least an object enablement datum with a plurality of action data based on the digital model using a machine-learning process. As used herein, a "programmed outline" refers to a guideline or set of action datum, or steps to support user in their user profile 112 identified endeavors. As used herein, an "action datum" refers to a single direction or human-executable function in support of the object enablement goal. Multiple aligned action data may be aggregated to form a plan or series of steps. These guidelines and/or steps are built by a programmed outline generator module 136. Programmed outline generator 136 may engage machine-learning processes to assess the plurality of historical resources and proprietary information to generate a viable action data sequence. This action data sequence acts as a set of actions to be executed by the user towards accomplishing the object enablement. Programmed outline generator 136 may accomplish this by converting the digital model's assigned classifier descriptor data tags into a representative plan which uses the identified starting point and ideal conclusion to build out the steps to achieve said conclusion. In a non-limiting embodiment, at least one successful prior object enablement datum may contain the specific steps executed to realize the goal, which based on the conversion of user profile 112, may be sufficiently similar based on a fuzzy set comparison to rely on as a baseline model object enablement datum. Programmed outline generator 136 may rely on proprietary sequences, including any identified successful paths or recommendations to support user. Proprietary sequences may include a decision tree or similar type of input-determinative output type of user engagement. These proprietary sequences may have a multitude of plans pre-configured based on the object enablement type, wherein each separate pre-configured plan may require user to specify a series of individual preferences to generate a comprehensive programmed outline. In the continued non-limiting embodiment from above, wherein an individual aspires to open a series of pizza franchises in South Dakota, programmed outline generator 136 may, based on available source material and historical object enablement data, lay out a plan with steps to identify ideal property locations based on population centroids and existent pizza services, acquire financial means through a proven business loan model wherein the South Dakota Credit Union is known to offer the best interests rates for small businesses in the area, assemble and train a workforce through a model skillset and pay scale plan, obtain the government approvals for construction, business establishment, employee insurance, and taxes, then identify and negotiate deals for raw materials based on a proprietary outline of the specific franchise's standard consumption rates. These steps may each be personalized based on the user profile 112 details. Where more user information would enable more informed planning, the chatbot system may prompt the user for additional details. Processor 104 may be configured to train a deep learning machine-learning model using object enablement action training data, wherein the training data comprises a plurality of object enablement data and action data as input correlated to a plurality of proprietary sequence as output. Once imported, machine-learning processes may use any, all or specific parts of multiple artificial and actual prior object enablement data to build a programmed outline. Additionally, processor 104 may determine the at least one proprietary sequence as a function of the user profile classifier descriptor data tags using the trained deep learning machine-learning model to pair the current object enablement datum with at least a stored candidate object enablement datum. This pairing of a current object enablement datum may rely on fuzzy set pairing to accurately match the user profile 112 object enablement datum with a stored object enablement datum. In a non-limiting embodiment, programmed outline generator 136 may weight or rank a multitude of potential programmed outlines based on the success rate in prior object enablement data and the positive or negative user feedback received based on those prior object enablements. Training data and machine-learning processes are discussed in detail in reference to FIG. 2 below. Fuzzy set pairing is discussed in detail below in reference to FIG. 4.

Still referring to FIG. 1, programmed outline generator 136 may employ a chatbot 120 to collect basic information and feedback from the user to support generating the programmed outline. To effectively gather the required information, chatbot 120 may require decisions based on user preferences, resources, timeline, and commitment, all of which may not be initially included within user profile 112. Chatbot 120 may initiate an object enablement with basic user information and build out the entire user profile 112 through individual prompts and queries until processor 104 obtains sufficient information to develop a user-specific plan. The chatbot 120 may rely on a proprietary decision tree wherein the required data for the various types of object enablements is encoded within the branches and sub-branches of the decision tree. In some cases, where the system is unable to obtain geographic, economic, or personnel related information about user profile 112 goals, processor 104 may use chatbot 120 to collect the user's best estimate of the scenario. In a non-limiting embodiment, where a user profile 112 indicates a business loan will be necessary, but processor 104 is unable to identify local banks and interest rates available, chatbot 120 may prompt user to search within the area for an establishment offering a business loan with the specific properties that processor 104 identifies as a best fit for the user. Chatbot operations based on machine-learning processes are discussed in detail below in reference to FIGS. 2-3.

Still referring to FIG. 1, programmed outline generator 136 may additionally engage a human employed or affiliated by a third party organization. As used herein, a "third party organization" is the overseeing entity who offers the services of apparatus 100 and provides the proprietary training information that may be used within the platform. Once a user profile 112 is fully assembled, processor 104 may identify a deficiency in analysis data around the user's specific object enablement type and request a coach from the apparatus' third party organization. In this case, a coach may execute the functionality traditionally accomplished by programmed outline generator 136. The coach may engage directly with user, or through programmed outline generator 136 such that user cannot differentiate the source of training and direction. The level of augmentation between human and machine-learning processes may be completely modifiable by the third party organization.

Still referring to FIG. 1, programmed outline generator 136 may enable an interaction between the user and a virtual portal 140, wherein the interaction comprises user reviews and queries of specific options as summarized by a third party organization. As used herein, a "virtual portal" is a digitally hosted user engagement wherein user may interrogate various options by interacting with each option based on a summarized display of the options costs, benefits, restrictions, obligations, and commitments. Virtual portal 140 may contain hundreds of different object enablement types, each with a digital overview presentation summarizing the object enablement's characteristics. In the continued non-limiting embodiment of a potential franchisee, virtual portal 140 may operate as a virtual franchise tradeshow, wherein each potential franchise hosts a booth which user may enter, ask questions, read summary material, review similar user experiences, and request further resources until user identifies a franchise option that fits user's needs. Continuing in this embodiment, once the best fit franchise option is identified, programmed outline generator 136 may build out the plan for user based on the specified franchise's startup obligations. Virtual portal 140 may enable the various involved entities to update their own virtual booth, or may establish a standardized layout of selections for user to interact with. Virtual portal 140 may enable live human engagement during the virtual tour, or it may allow for user to share their contact information for a later scheduled meeting. Additionally, virtual portal 140 may be an end-to-end software-based engagement, wherein no human input is required after initial establishment outside of the user queries. Virtual portal 140 may host a multitude of object enablement types and the individual user options within each type. In a non-exhaustive list of potential embodiments, virtual portal 140 may operate as a job-seeker forum with employer options in the virtual booths, a franchisee coach selection portal wherein the various franchisee coaches each operate a booth based on their experience and coaching methods, a fast food franchise ownership portal wherein each franchise option displays the entry costs, operational demands, and benefits, or the portal may support professional employee training opportunities, wherein the different coursework and study program options are displayed in each booth. All virtual portal 140 object enablement selections are used by programmed outline generator 136 to build out the best fit plan for the user. Each virtual portal 140 supported object enablement may be accompanied by an integrated or separate decision tree node with built out branches and sub-branches to guide the user through a proprietary set of steps and/or recommendations.

Still referring to FIG. 1, programmed outline generator 136 determines at least an action datum 142 from the plurality of action data contained within the generated programmed outline using a prioritized heuristic model. In one or more embodiments, programmed outline generator 136 determines at least an action datum 142 from the plurality of action data contained within the generated programmed outline using a prioritized heuristic mathematical model. For the purposes of this disclosure, "Heuristic" refers to a computational and/or algorithmic approach associated with problem solving or decision making in which practical problem-solving techniques are used to find a quick solution for complex issues or larger data sets. In instances where an optimal solution may be feasibly impossible or take a vast amount of time, a practical technique may be used to estimate the solution. In some instances a proximal result received quicker may be more desired than an optimal result that may take a large amount of time to process. In one or more embodiments, a heuristic model may include a data structure of algorithms configured to approximate complex issues. In one or more embodiments, heuristic models may be used to generate practical or simple solutions prior to generating more difficult solutions. In one or more embodiments, a heuristic model may include a data structure having a plurality of rules and/or algorithms. These rules may contain conditions and corresponding actions as to how the rules should be implemented. For example, rules may be triggered when a particular data is received. In another non limiting example, rules may be triggered in a sequential order. In one or more embodiments, heuristics may be applied during a decision-making process wherein heuristics may be used to prioritize rules, resolve issues and determine which rules and/or sequence of rules may result in the quickest and most proximal result. In one or more embodiments, heuristic models may be used to arrive at a conclusion quickly by selecting the most likely result. For example, and without limitation, a heuristic model in medicine may be used to determine the most likely diagnosis based on the most immediate information. Heuristic models may then determine more accurate results as time goes on. In this instance, a heuristic model may determine the most likely action datum may determining the presence of various elements within an input data set. In one or more embodiments, heuristic models may determine which set of information within a given data set may be the most effective in generating a solution. For example, and without limitation Heuristic models may select a particular element within a given data set and generate results from the given element. In one or more embodiments, a computing system may receive a large data set wherein a heuristic model may be used to select only pertinent information within the large data set and compute a result based on the pertinent information. In one or more embodiments, heuristic models contain given boundaries wherein outputs are constrained within a defined boundary to ensure that outputs are not inaccurate.

In one or more embodiments, and continuing to refer to FIG. 1, a heuristic model may contain predetermined parameters wherein outputs must adhere to the predetermined parameters. In one or more embodiments, a heuristic model may contain boundaries and/or predetermined threshold that guide the decision-making process. For example, and without limitation, a heuristic model may have minimum and maximum thresholds, be bound to a particular area, contain restraints ensuring that outputs are within a given range and the like. In one or more embodiments outputs of given systems may contain a particular tolerance sometimes referred to as an 'epsilon' wherein given outputs within the epsilon may be sufficient. In one or more embodiments, a heuristic model may be configured to output a given result within a given epsilon and/or tolerance level. For example and without limitation, more than one acceptable action datums may be determined by process wherein a heuristic model may be configured to select one of the more than one acceptable action datums. In another non limiting example, computing device may be configured to select an action datum that contains the highest likelihood of match wherein approximating the degree of match may be sufficient and lead to the same output. In one or more embodiments, a heuristic model may be created by establishing a set of rules and/or algorithms and applying those rules and/or algorithms to given scenarios. In one or more embodiments, the algorithm may be applied to scenarios with already known outcomes wherein the algorithms may be fine-tuned based on their outcomes in comparison to the already known outcomes. In one or more embodiments, additional algorithms may be applied following each iteration to ensure efficiency and/or accuracy of outputs generated by the heuristic model. In one or more embodiments, heuristic model may include a data structure of given algorithms wherein the algorithms may be modified and/or the data structure may be modified to ensure more accurate results. In one or more embodiments, algorithms may be modified to quicken the decision-making process and increase the computational efficiency of the model. In one or more embodiments, heuristic models may be trained iteratively wherein following each iteration, algorithm, parameters, restraints, and the like may be modified to improve the model. In one or more embodiments, the heuristic model may be tested and/or validated using a baseline following each iteration to ensure proper output of the model. In one or more embodiments, heuristic models may be iteratively trained using a feedback loop wherein generated results and corresponding feedback may be used to determine the accuracy of the model. In one or more embodiments, user feedback may indicate that an output was either accurate or inaccurate wherein heuristic model may use the feedback to fine tune parameters. In one or more embodiments, feedback may allow for quicker decision making in future iterations wherein a smaller set of data may be used to generate the same or similar results.

In one or more embodiments and continuing to refer to FIG. 1, heuristic models may be used to generate outputs based on readily available information. For example, and without limitation, user profile 112 may contain limited information wherein a heuristic process and/or model may make deductions and/or assumptions to arrive at a desired output even if the desired output may not be the most optimal. In one or more embodiments, heuristic models may be used to generate outputs based on readily available information. In one or more embodiments, heuristic models may be used in situations in which an exact output is unfeasible or unnecessary. For example, and without limitation, in instances where outputs are limited, it may be computationally unnecessary to analyze a vast amount of data. Rather, a heuristic process may select elements of the data that are most useful to generate a desired result. In one or more embodiments, a heuristic model may be used to generate quicker responses in situations in which an optimal result is not necessary. In one or more embodiments, a heuristic model may allow for an efficient process in which a small selection of data may be used to generate a desired result. In one or more embodiments, processor may select elements of user profile 112 that may provide for a desired result. In one or more embodiments, processor may receive programmed outline and use a heuristic process to determine action datum. In one or more embodiments, heuristic model may be used to select the next best move or step in a process in instances where the most optimal step is unnecessary.

In one or more embodiments, and continuing to refer to FIG. 1, creating a heuristic model may include identifying the relevant data that will be fed into the model, and establishing one or more heuristic rules wherein the heuristic rules contain guidelines as to how to simplify the decision marking process. In one or more embodiments, heuristic models may be trained in order to provide more optimal outputs or to maximum efficiency during a heuristic process. In one or more embodiments, a heuristic model may be trained wherein training the model may include changing heuristic rules based on inaccurate results and/or changing circumstances. In one or more embodiments, a heuristic model may be used to train one or more machine learning models as described in this disclosure. In one or more embodiments, heuristic models may be used to train machine learning models to generate a desired result in instances where an optimal result may not be available. In one or more embodiments, heuristic models may be used to train machine learning models wherein the machine learning models may be trained to select elements and/or portions of inputs to generate desired results. In one or more embodiments, in instances wherein training data may be limited heuristic models may be used to approximate and generate desired outputs based on the limited training data.

Further referring to FIG. 1, A "prioritized heuristic model" for the purposes of this disclosure is a heuristic model that uses a set of prioritized rules to make decisions. For example, and without limitation, a prioritized heuristic model may include a set of rules wherein each rule may contain priority over the previous rule. In one or more embodiments, in a prioritized heuristic model rules that are prioritized are first used to generate desired results. In instances, wherein desired results are not generated, the next set of rules in the priority may be used. In an prioritized heuristic model, a computing device uses the most optimal set of rules to generate a proximate result and continues with less optimal rules to generate a desired result. In one or mor embodiments, rules within the prioritized heuristic model may be given a priority or ranking wherein the priority or ranking determines at which point the rule may be executed. In one or more embodiments, rules may be applied sequentially until a desired result is achieved. In one or more embodiments, a prioritized heuristic model may allow for increased efficiency wherein rules are only used when necessary to achieve a desired result. In one or more embodiments, a prioritized heuristic rule with the highest priority may provide the most desired result, whereas a rule with lower priority may provide a less optimal result. In one or more embodiments, a rule with lower priority may serve as a safety net in instances wherein the higher priority rule does not provide an optimal result based on given restraints and limitations. In one or more embodiments, prioritized heuristic models may allow for increased efficiency wherein rules are only applied if needed. In one or more embodiments, prioritized heuristic models may provide for more efficient processing in situations in which the timing of the output may take priority in the accuracy of the output. In one or more embodiments, a prioritized heuristic model may provide for quicker outputs in situations with limited outputs. In one or more embodiment, prioritized heuristic models may be used train machine learning models such as any machine learning model as described in this disclosure. In one or more embodiments, prioritized heuristic models may include the selection of prioritized features or elements wherein the features or elements within an input may be prioritized. In one or more embodiments, a machine learning model may first start by receiving only the most important and/or prioritized elements in order to generate an output and then transition to less prioritized elements in situations in which a desired result is not achieved. In one or more embodiments, data fed into a machine learning model may be large and cause unnecessary processing and/or delays. In one or more embodiments, prioritized heuristic models may allow for selection of important elements necessary to generate desired outputs prior to using less prioritized elements. In one or more embodiments, heuristic models may be used to train machine learning models wherein only specific elements within the input may be used to generate an output. In one or more embodiments, various elements within a data set may have a large impact on a desired output wherein other elements within the data set are unnecessary and can cause unnecessary and increased computation. In one or more embodiments, a machine learning model may be trained to prioritize elements within an input in order to generate desired outputs using the least amount of data necessary. In one or more embodiments, a heuristic model and/or prioritized heuristic model may allow for training of the machine learning model wherein only elements that are prioritized are first fed into the model. In one or more embodiments, the use of a heuristic model and/or prioritized heuristic model may allow for increases resource allocation wherein resource of computing device may be allocated to differing processes and/or steps. In one or more embodiments, heuristic model may be used to run simulations more efficiently wherein only prioritized data may be fed into the simulation to generate similar or proximate results. In one or more embodiments, in instances where optimal results are not required, heuristic model may be used to determine and/or select desired results that are sufficient in proximity to the optimal results. In one or more embodiments, a heuristic model may include the use of a greedy algorithm wherein the greedy algorithm may be used to generate an output by selectin the best available option at the moment. In one or more embodiments, in instances where outputs are constrained to a limit quantity such as plurality of action data, it may seem unnecessary to generate an optimal result in instances where processor is constrained to the data presented. In one or more embodiments, greedy algorithm may be used to determine an action datum from plurality of action data. In one or more embodiments, one or more heuristic models may be used to train one or machine learning models as described in this disclosure. In one or more embodiments, A heuristic model may allow for training of a machine learning model by limiting inputs to create similar outputs. For example, and without limitation, one or more machine learning models may be trained to generate similar outputs in instances where inputs are limited and/or absent. In one or more embodiment, heuristic models may be used to decrease the number of inputs necessary to generate a desired output. In one or more embodiments, heuristic rules within heuristic model may train one or more machine learning models as described in this disclosure in order to train the machine learning models to generate outputs even in situations with limited inputs. In one or more embodiments, heuristic rules may allow for training of one or more machine learning models to generate outputs that are proximal to an optimal output in instances where an optimal output may not exist.

With continued reference to FIG. 1, as used herein, an "action datum" is the immediate succeeding action the user should execute as determined by the programmed outline. This is accomplished by detaching the immediate highest priority step from programmed outline generator's 136 plan and presenting it to the user via a user display 144. User display 144 may be any device capable of communicating with processor 104 and displaying digitally formatted information. The action datum 142 may be modified and updated based on programmed outline generator's 136 identified plan and user feedback of what has so far been accomplished. In a non-limiting embodiment, where a user profile 112 contains a user's aspirations to open a pizza franchise in South Dakota, programmed outline generator 136 may generate a plan as outlined above. User may have begun executing the plan in accordance with processor's 104 direction such that the next highest priority, most time-constrained obligation would be to hire or identify a managerial entity for each franchise site. The displayed action datum 142 may be accompanied by specified recommendations or resource material regarding what characteristics a best fit manager should embody as well as what types of salary and contract to employ the manager under. A heuristic, mathematical model may identify the most appropriate action datum 142 by iteratively selecting each available action datum 142 option as correlated by associating the user profile 112 with a model or candidate object enablement which was built from a historical user object enablement or an artificially generated plan correlated to the user's object enablement type. In a separate non-limiting embodiment, wherein no action has been taken, but user profile 112 outlines an aspiring franchisee's goal of establishing a delivery service, action datum 142 may recommend the user meets with a financial advisor to secure the requisite funding. In an embodiment, information regarding funding including the process of selecting and introducing various funding partners may occur at the beginning of this process, to provide the user with a comprehensive view of financial options and strategic partnerships. Early introduction to funding partners may allow the user to consider financial strategies and resources from the start, aligning financial planning with personal development goals.

Still referring to FIG. 1, processor 104 may be configured to optimize the at least an action datum 142 as a function of a heuristic extrapolation using a Monte Carlo simulation. As used herein, a "Monte Carlo simulation" may refer to a "Monte Carlo method," "Monte Carlo experiment," and/or executing a "Monte Carlo algorithm." A Monte Carlo simulation is a mathematical technique that may generate variables, numerical values, and the like, for modeling risk, uncertainty, etc. of a certain system using a stochastic simulation process. Monte Carlo simulations may encompass a range of algorithms and mathematical analysis techniques such as Markov Model Monte Carlo (MMMC) simulations, McKean-Vlasov processes, Monte Carlo localization, among other probabilistic heuristics. As used herein, a Monte Carlo simulation may generate random action datum 142 directions, wherein each action datum 142 may represent a sufficiently good solution to an optimization problem based on programmed outline generator's 136 determined plan, wherein the solution is an action datum 142 represented by a numerical value, 2D polar coordinate, vector, matrix, or the like, that represents a highest priority, most time-intensive, most cost-saving, or other value prioritization for the action datum 142. Each generated action datum 142 may have associated with it a priority value, or importance based on the severity of implications for any delays in executing the action datum 142. And thus, each action datum 142 may have a time-to-completion assessment based on the execution of the action datum 142 to accomplish the user's goal based on the randomly generated action datum 142. Each generated action datum 142 may then have associated with it an "cost saving" variable, wherein the cost saving is a numerical value that represents the benefit of executing the identified action datum 142 immediately for a given programmed outline generator 136 solution. Action datums 142 can be plotted and/or mapped as a function of their time commitment and remaining step's estimated timing and a machine-learning process may select the action datum 142 based on some criterion, for instance the programmed outline step that most effectively reduces the time to completion of user's goals, and selects that action datum 142 as an input to subsequent calculations.

A Monte Carlo simulation is a class of computation algorithms used by a machine-learning process that may rely on repeated stochastic sampling to obtain numerical results, for instance generating random spatial locations within a confined space on a map, wherein each spatial location can have a numerical parameter describing it. Monte Carlo simulations may be performed with dynamic systems that may be coupled with an analysis method, for instance an unknown order of operations relative to a prioritization method based on overall time-saving, wherein the final delivery or completion time is determined by sampling within the simulation for all of the various orders of operation available. In non-limiting illustrative examples, a machine-learning process, such as programmed outline generator 136, may accept generated candidate solutions from a Monte Carlo simulation, as described above, and calculate refined plans to the candidate set of steps generated by the machine-learning algorithms, wherein the predicted paths may contain numerical results from the simulated variations of required steps. The Monte Carlo simulation may generate many candidate action datum 142 directions, where a machine-learning process/model may narrow the number of action datum 142 directions based on their effect on the estimated delivery or completion date and/or minimizing cost based on the user object enablement type. Such a machine-learning process may iteratively generate selected action datum 142 directions based on a criterion, for instance and without limitation, a cost less than a set amount, wherein when it is time for a determined action datum 142 to be used for purposes of establishing a new franchise restaurant, a machine-learning process may retrieve the action datum 142 to optimize cost savings.

Still referring to FIG. 1, processor 104 is configured to direct the user to a plurality of object enablement datum resources as a function of the determined at least an action datum 142 and the programmed outline. As used herein, "directing user" implies displaying a set of object enablement datum resources through user display 144. These directions may be abbreviated, highlighted, redacted, or otherwise synthesized pieces of information, training opportunities and/or information resources from multiple sources. This process is accomplished by an object enablement datum resource module 148. As used herein and described immediately above, "object enablement datum resource" refers to any available relevant and pertinent material including any training opportunities, reference material, or other resources, and detraction of the unnecessary portions of the identified material, and displaying of the information in a digestible manner. Processor 104 may be configured to search the database 116 for a plurality of resource material or training opportunities with common classifier descriptor data tags as those appended to the digital model. Displaying the most digestible manner may be based on machine-learning processes to synthesize and modify the display of the resource material in a manner to maximize the user's understanding of how to execute the remaining steps identified within the programmed outline generator 136 developed plan. Processor 104 may be configured for object enablement datum resource module 148 to initially search all available references for the relevant and applicable information. This search may consist of local databases containing proprietary material as well as historical user object enablements which have successfully conducted similar operations, as well as internet based searches using machine-learning processes to identify reliable sources on the web. Object enablement datum resource module 148 may further rely on human guidance to narrow the search, such as a chatbot prompt to the user, or a human operator request for a host organization employee to assist in identifying the appropriate resource(s). Continuing with the non-limiting embodiment of an entity aspiring to open a pizza franchise in South Dakota, object enablement datum resource module 148 may compile a set of instructions based on and/or including the laws, regulations, and ordinances applicable within the local jurisdiction as well as the acceptable paths to legally navigate those limitations. Next, object enablement datum resource module 148 may compile the identified relevant and applicable resources within a temporary, local database. This temporary, local database may be contained within memory 108, database 116, or some other quickly accessible, modifiable data structure. Object enablement datum resource module 148 may then classify and label the identified resources to improve usability for the user. In a continued non-limiting embodiment, the identified laws may all be saved in a text format within memory 108 and may undergo a classifier descriptor data tag application process similar to that conducted by classifier 128, such that each law is summarized as a "zoning-related", "hiring practices", "disability-based construction", or any other appropriate summary of how the law applies to the specific object enablement. Processor 104 may next be configured to prioritize the plurality of resource material and training opportunities based on a confidence score of the common classifier descriptor data tags. This confidence score may be calculated by processor 104 and assessed based on the number of matched classifier descriptor tags, or quality of the match as compared to the average number or quality of matched classifier descriptor data tags. This process may involve a step wherein processor 104 synthesizes the identified resources for user viewability. As used herein, "synthesize" or "synthetization" refers to the process of combining related resources in a logically flowing manner and eliminating the information that is not useful from being displayed. In a non-limiting embodiment, this synthetization process may identify a set of ordinances governing construction and reduce the dozens of affiliated pages of information into single lines "do not build franchise within residential zoning provinces", "ensure a wheelchair accessible entry/exit point is constructed", or "do not build a food franchise within 500 feet of an industrial complex". Finally, object enablement datum resource module 148 may be configured to display the prioritized list of the discovered object enablement datum resources for the user. Prioritization may be based on displaying the most common mistakes first, the most costly mistakes first, or may display all resources based on a proprietary prioritization method. In the continued non-limiting embodiment based on user aspiring to open a pizza franchise, prioritization may be based on either cost, or timing, or both factors when a combined weighting method is employed and therefore generates a set of resources which includes guidelines around programmed budgeting first since significant portions of the historical user base has provided feedback that budget planning at the outset would have best helped them achieve success.

Still referring to FIG. 1, processor 104 is configured to display the programmed outline and the plurality of object enablement datum resources to the user. As described above, user display 144 receives the display configuration instructions from processor 104. User display 144 may be modified to display information in any format deemed appropriate by the user, and may display different information based on what is most important as assessed by machine-learning processes, or user feedback. Processor 104 may use machine-learning processes to dynamically modify the user display 144 based on historical object enablement data and user inputs. Modification of user display 144 may be based on embedded event handlers wherein a specific action or input causes processor 104 to automatically update the displayed fields. In a non-limiting embodiment, when the user selects a restaurant franchise type of object enablement, display 144 may automatically display the list of available restaurant franchises and a set of franchise details next to each option. The options displayed may also be re-configured upon each processing output from processor 104. In a non-limiting embodiment, where an action datum 142 contains a recommendation to secure franchise funding, processor 104 may identify a set of recommended financial establishments and display the list with contact information within display 144. Display 144 may support a graphical user interface for chatbot operations or other forms of user interaction. A "graphical user interface (GUI)," as used herein, is a graphical form of user interface that allows users to interact with electronic devices. In some embodiments, a GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a GUI. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like. In a non-limiting embodiment, user display 144 may refer to multiple displays used collaterally to ingest, export, or share data across multiple platforms.

Still referring to FIG. 1, processor 104 may compute a score associated with each classifier descriptor data tag match (e.g. initial application of classifier descriptor data tags to user profile 112, identification of a candidate object enablement to baseline a programmed outline from, etc.) and select the greatest quantity of historical matches of the same type to minimize and/or maximize the score, depending on whether an optimal result is represented, respectively, by a minimal and/or maximal score; a mathematical function, described herein as an "objective function," may be used by processor 104 to score each possible pairing. Objective function may be based on one or more objectives as described below. In various embodiments a score of a particular classifier descriptor data tag pair may be based on a combination of one or more factors, including maximizing classifier descriptor data tags used. Each factor may be assigned a score based on predetermined variables. In some embodiments, the assigned scores may be weighted or unweighted. Optimization of objective function may include performing a greedy algorithm process. A "greedy algorithm" is defined as an algorithm that selects locally optimal choices, which may or may not generate a globally optimal solution. For instance, processor 104 may select prior matched classifier descriptor data tags so that scores associated therewith are the best score for each potential new match.

Still referring to FIG. 1, objective function may be formulated as a linear objective function, which processor 104 may solve using a linear program such as without limitation a mixed-integer program. A "linear program," as used in this disclosure, is a program that optimizes a linear objective function, given at least a constraint. In various embodiments, apparatus 100 may determine a classifier descriptor match that maximizes a total score subject to a constraint that prior classifier descriptor data tag matches that subsequently received negative user feedback are unavailable. A mathematical solver may be implemented to solve for the set of classifier descriptor matches that maximizes scores; mathematical solver may be implemented on processor 104 and/or another device in apparatus 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, processor 104 may assign variables relating to a set of parameters, which may correspond to score components as described above, calculate an output of mathematical expression using the variables, and select a classifier descriptor match that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Referring now to FIG. 2, an exemplary embodiment of a machine-learning module 200 that may perform one or more machine-learning processes as described in this disclosure is illustrated. Machine-learning module 200 may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a processor 104 to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptor data tags of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example user profile 112 may include a set of user goals centered around establishing a chain of shipping and printing service establishments around Charlotte, North Carolina. In that embodiment, machine-learning processes may apply a set of classifier descriptors, which may be matched by a fuzzy set comparison process as described below, and result in a digital profile with classifier descriptor data tags such as "entrepreneur", "printing services", "shipping services", "city Charlotte", "state North Carolina", or any other plurality of labels which may support the apparatus' operation.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a module derives a classifier from training data 204. Classification may be performed using, without limitation, linear classifiers such as without limitation logistic regression and/or naive Bayes classifiers, nearest neighbor classifiers such as k-nearest neighbors (KNN) classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to restaurant franchisee, chemistry PhD candidate, or jiu jitsu student.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a KNN algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a user profile as described above as an input, and a digital model with appended descriptors summarizing the user profile as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
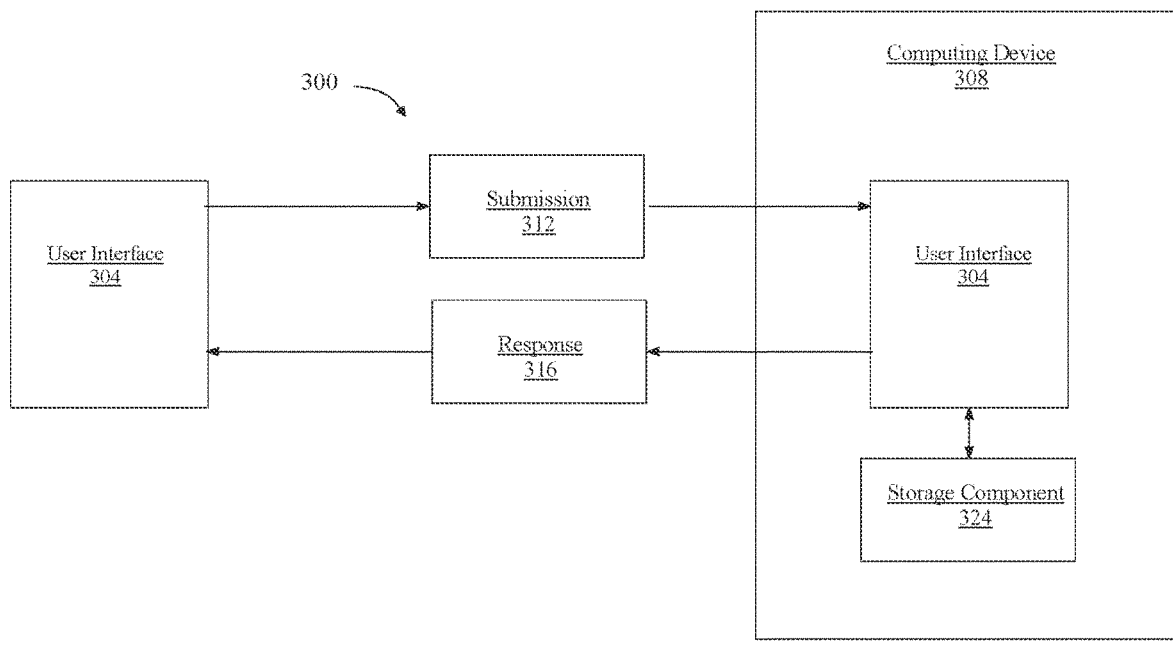
FIG. 3 is an illustration of an exemplary embodiment of a chatbot.

Referring now to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304.

Figure 4:
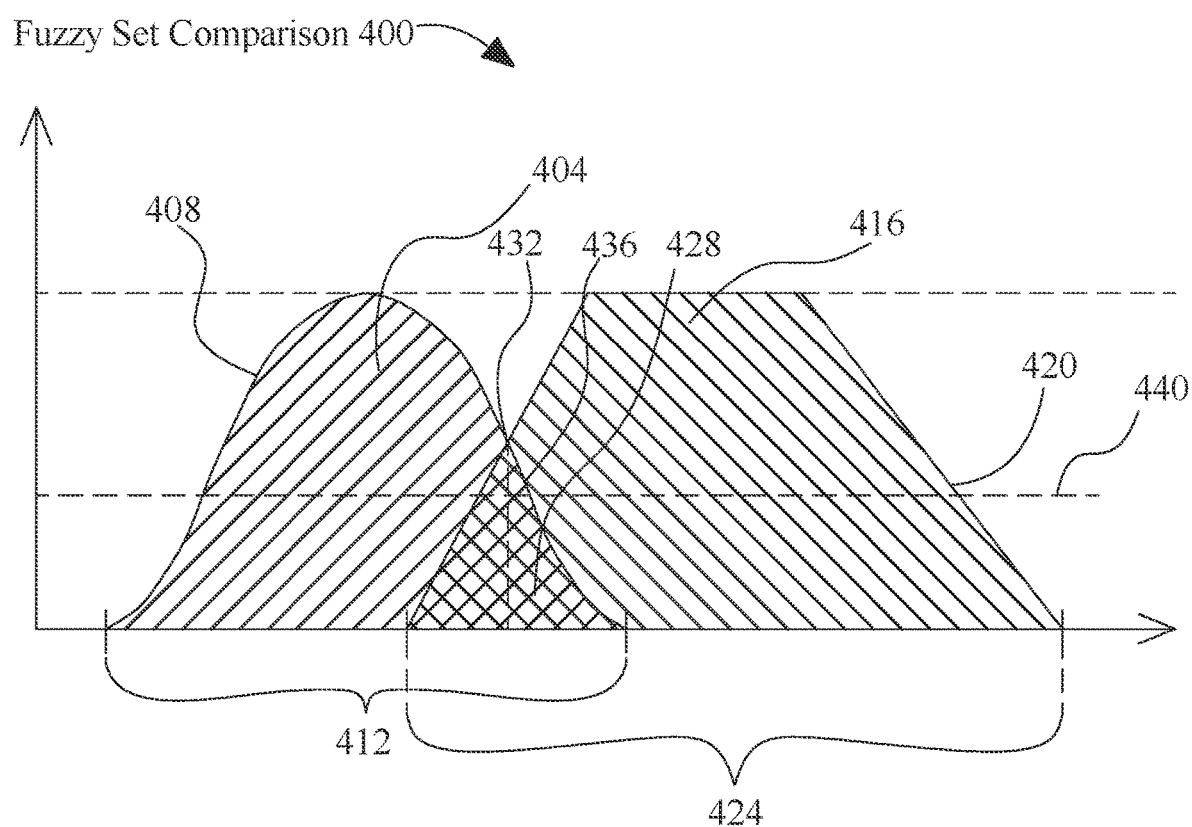
FIG. 4 is an exemplary embodiment of a fuzzy set comparison.

Referring now to FIG. 4, an exemplary embodiment of fuzzy set comparison 400 is illustrated. A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0, 1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 4, first fuzzy set 404 may represent any value or combination of values as described above, including output from one or more machine-learning models, a user profile, an avatar, or a set of steps. A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 408 and second membership function 420 may intersect at a point 432 representing a probability, as defined on probability interval, of a match between first fuzzy set 404 and second fuzzy set 416. Alternatively or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, threshold may indicate a sufficient degree of overlap between a user profile characteristic and a certain descriptor application. Alternatively or additionally, each threshold may be tuned by a machine-learning and/or statistical process, for instance and without limitation as described in further detail below.

Further referring to FIG. 4, in an embodiment, a degree of match between fuzzy sets may be used to classify a user profile which is indicative of a mobile vendor franchise with a classifier descriptor data tag of "franchisee", "mobile business", or any other relevant descriptor classification. For instance, if a user profile is matched with a specific host organization coach based on the fuzzy sets having a degree of overlap exceeding a threshold, apparatus may classify the specified coach as useful for the object enablement data. Where multiple fuzzy matches are performed, degrees of match for each respective fuzzy set may be computed and aggregated through, for instance, addition, averaging, or the like, to determine an overall degree of match.

Still referring to FIG. 4, in an embodiment, a user profile may be compared to multiple descriptor fuzzy sets. For instance, user profile may be represented by a plurality of fuzzy sets that may be compared to each of the multiple classifier descriptor data tag fuzzy sets; and a degree of overlap exceeding a threshold between the user profile fuzzy set and any of the multiple classifier descriptor data tag fuzzy sets may cause apparatus to classify the user profile with the compared classifier descriptor data tag. For instance, in one embodiment there may be two user profile fuzzy sets, representing respectively franchisee and an organizational coach. Franchisee may have a franchisee fuzzy set; organizational coach may have an organizational coach fuzzy set; and each classifier descriptor data tag may have a distinct classifier descriptor data tag fuzzy set. Apparatus, for example, may compare a user profile set with each of the organizational coach fuzzy set and classifier descriptor data tag fuzzy sets, as described above, and classify the user profile to either, both, or neither of organizational coach nor classifier descriptor data tag fuzzy sets. Machine-learning methods as described throughout may, in a non-limiting example, generate coefficients used in fuzzy set equations as described above, such as without limitation x, c, and a of a Gaussian set as described above, as outputs of machine-learning methods. Likewise, classifier descriptor data tags, or any other used digital entities, rules, or applications, may be used indirectly to determine a fuzzy set, as the classifier descriptor data tag fuzzy set may be derived from outputs of one or more machine-learning models that take the classifier descriptor data tags directly or indirectly as inputs.

Figure 5:
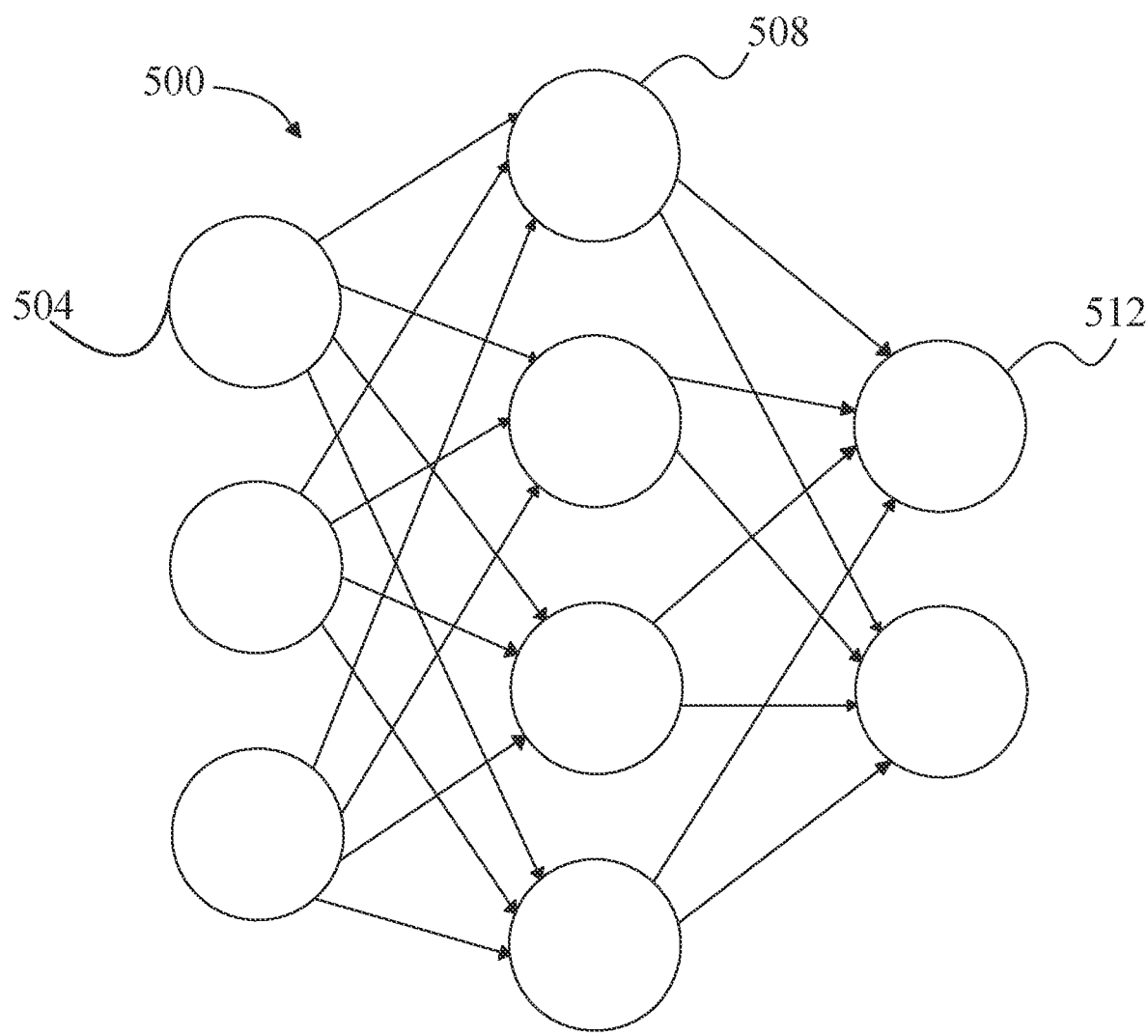
FIG. 5 is a diagram of an exemplary embodiment of a neural network in accordance with one or more embodiments of the present disclosure.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
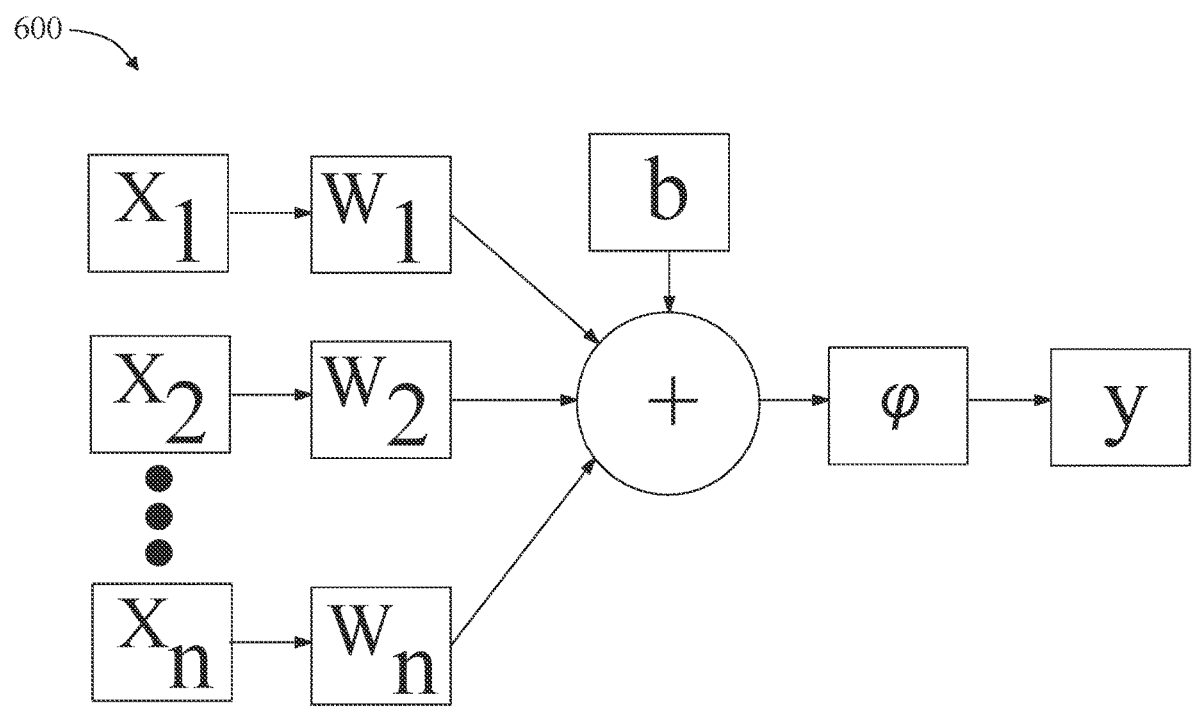
FIG. 6 is a block diagram of an exemplary embodiment of a node of a neural network in accordance with one or more embodiments of the present disclosure.

Referring now to FIG. 6, an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
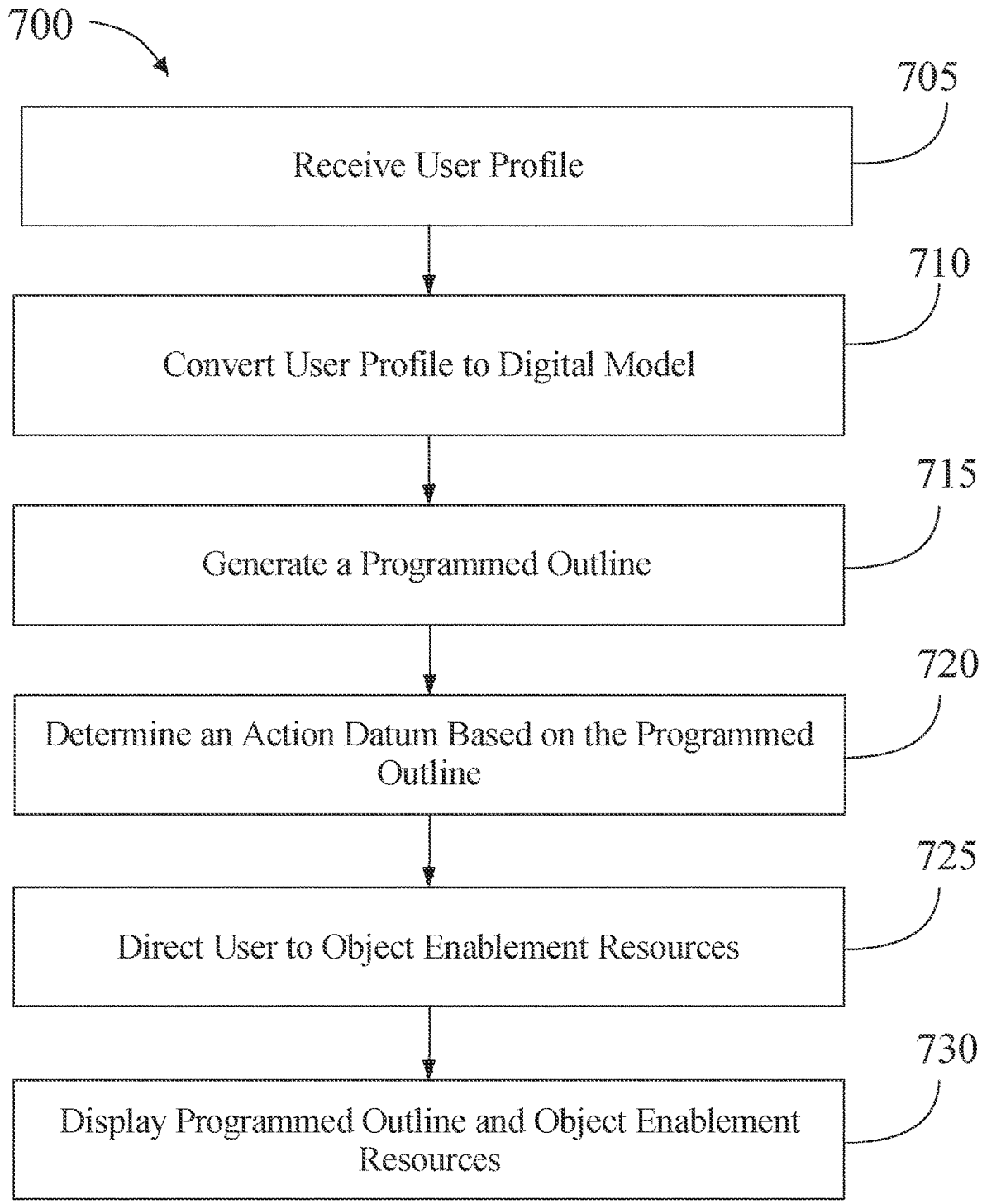
FIG. 7 is a flow diagram of an exemplary method for automated mentorship using machine-learning processes.

Referring now to FIG. 7, a simplified diagram of a method 700 for automated mentorship using machine-learning processes according to some embodiments is shown. According to some embodiments consistent with FIGS. 1-6, method 700 may be performed by processor 104.

Still referring to FIG. 7, at step 705, method 700 includes receiving, by the at least a processor, a user profile from a user with at least an object enablement datum. This may be implemented as described and with reference to FIGS. 1-6.

Still referring to FIG. 7, at step 710, method 700 includes converting, by the at least a processor, the user profile to a digital model by applying at least one classifier descriptor data tag. This may be implemented as described and with reference to FIGS. 1-6.

Still referring to FIG. 7, at step 715, method 700 includes generating, by the at least a processor, a programmed outline for the at least an object enablement datum with a plurality of action data based on the digital model using machine-learning processes. This may be implemented as described and with reference to FIGS. 1-6.

Still referring to FIG. 7, at step 720, method 700 includes determining, by the at least a processor, an action datum from the plurality of action data within the programmed outline using a prioritized heuristic model. This may be implemented as described and with reference to FIGS. 1-6.

Still referring to FIG. 7, at step 725, method 700 includes directing, by the at least a processor, the user to a plurality of object enablement datum resources as a function of the determined action datum and programmed outline. This may be implemented as described and with reference to FIGS. 1-6.

Still referring to FIG. 7, at step 730, method 700 includes displaying, by the at least a processor, the programmed outline and object enablement datum resources to the user. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
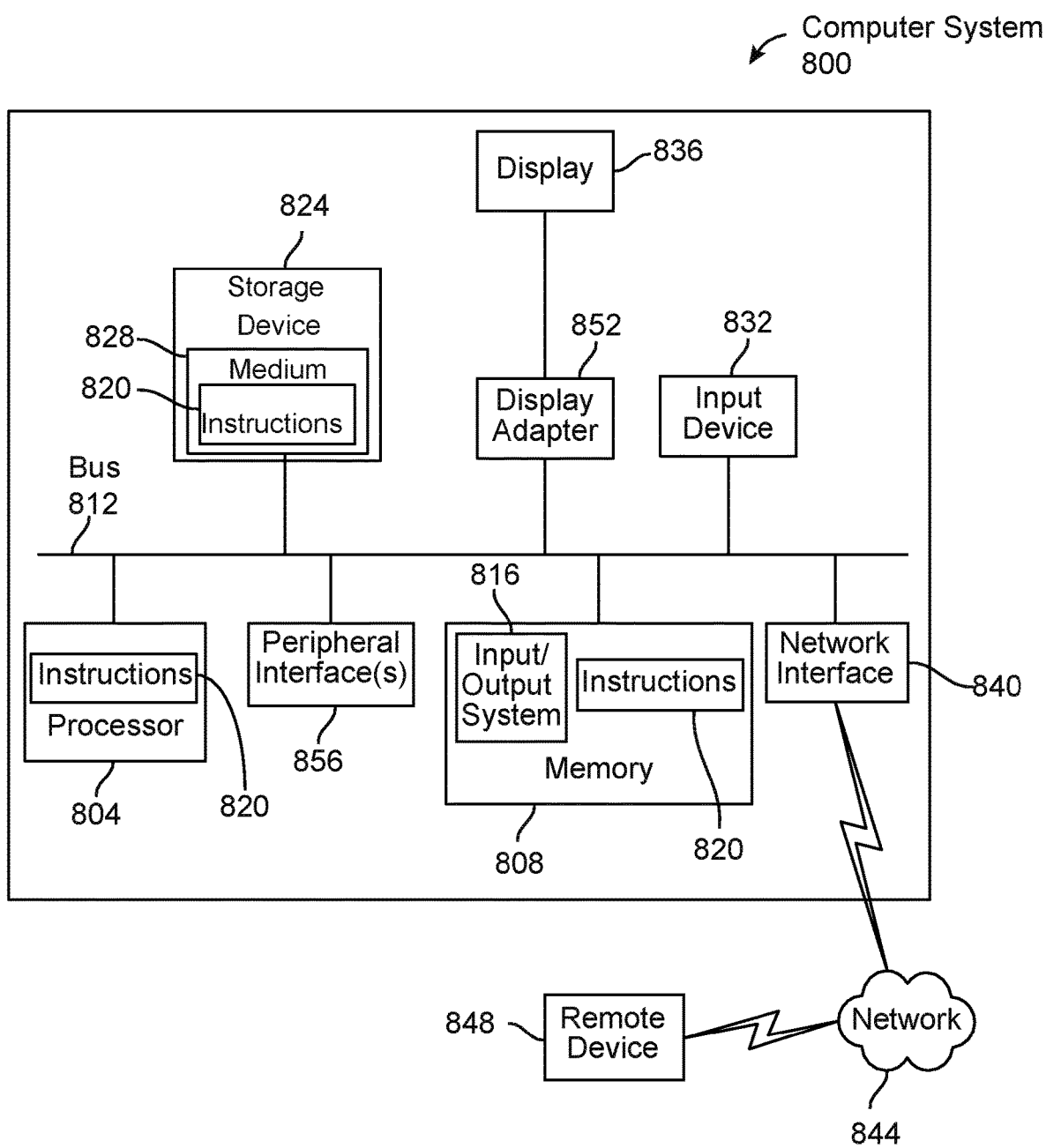
FIG. 8 is a block diagram of a computer device that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for automated mentorship using machine-learning processes, wherein the apparatus comprises:
at least a processor;
and a memory communicatively connected to the at least a processor, wherein the memory contains instructions configuring the at least a processor to:
receive a user profile from a user, wherein the user profile comprises at least an object enablement datum;
convert the user profile to a digital model by applying at least one classifier descriptor data tag, wherein converting the user profile to the digital model further comprises:
generating a profile classifier using historical object enablement data training data, wherein the historical object enablement data training data comprises a plurality of historical object enablement data as input correlated to a plurality of classifier descriptor data tags as output;
classifying the user profiles and itemized portions of user profiles into at least one classifier descriptor data tag using the profile classifier; and appending descriptors to the digital model, individual parts of the model, or identified clusters of model characteristics;

generate a programmed outline for the at least an object enablement datum with a plurality of action data based on the digital model using a machine-learning process;

determine at least an action datum from the plurality of action data within the programmed outline using a heuristic model;

direct the user to a plurality of object enablement datum resources as a function of the determined at least an action datum and the programmed outline; and display the programmed outline and the plurality of object enablement datum resources to the user.

2. The apparatus of claim 1, wherein receiving the user profile from the user comprises:

interfacing with the user using a chatbot to collect required data, as determined by a decision tree progression; and populating the required data within the user profile as part of the digital conversion process.

3. The apparatus of claim 1, wherein the user profile comprises a historical user profile.

4. The apparatus of claim 1, wherein converting the user profile to the digital model comprises generating a representative user avatar.

5. The apparatus of claim 1, wherein generating the programmed outline comprises:

training a deep learning machine-learning model using action training data, wherein the action training data comprises a plurality of object enablement data and action data as input correlated to a plurality of proprietary sequences as output; and determining at least one proprietary sequence as a function of the at least one classifier descriptor data tag using the trained deep learning machine-learning model to pair the current object enablement datum with at least a stored candidate object enablement data.

6. The apparatus of claim 1, wherein directing the user to the plurality of object enablement datum resources comprises:

searching a database for a plurality of resource material or training opportunities with common classifier descriptor data tags;

prioritizing the plurality of resource material and training opportunities based on a confidence score of the common classifier descriptor data tags; and displaying the prioritized plurality of resource material and training opportunities.

7. The apparatus of claim 1, wherein displaying the programmed outline and object enablement datum resources comprises using machine-learning processes to dynamically modify the user display based on historical object enablement data and user inputs.

8. The apparatus of claim 1, wherein determining the at least an action datum from the plurality of action data within the programmed outline comprises optimizing the at least an action datum as a function of a heuristic extrapolation using a Monte Carlo simulation.

9. The apparatus of claim 1, wherein generating the programmed outline for the at least an object enablement datum comprises enabling an interaction between the user and a virtual portal, wherein the interaction comprises user reviews and queries specific options as summarized by a third party organization.

10. A method for automated mentorship using machine-learning processes, wherein the method comprises:

receiving, by the at least a processor, a user profile from a user, wherein the user profile comprises at least an object enablement datum;

converting, by the at least a processor, the user profile to a digital model by applying at least one classifier descriptor data tag, wherein converting the user profile to the digital model comprises:

generating, by the at least a processor, a profile classifier using historical object enablement data training data, wherein the historical object enablement data training data comprises a plurality of historical object enablement data as input correlated to a plurality of classifier descriptor data tags as output;

classifying, by the at least a processor, the user profiles and itemized portions of user profiles into at least one classifier descriptor data tag using the profile classifier; and appending, by the at least a processor, descriptors to the digital model, individual parts of the model, or identified clusters of model characteristics;

generating, by the at least a processor, a programmed outline for the at least an object enablement datum with a plurality of action data based on the digital model using a machine-learning process;

determining, by the at least a processor, at least an action datum from the plurality of action data within the programmed outline using a heuristic model;

directing, by the at least a processor, the user to a plurality of object enablement datum resources as a function of the determined at least an action datum and the programmed outline; and displaying, by the at least a processor, the programmed outline and the plurality of object enablement datum resources to the user.

11. The method of claim 10, wherein receiving the user profile from the user comprises:

interfacing, by the at least a processor, with the user using a chatbot to collect the required data, as determined by a decision tree progression; and populating, by the at least a processor, the required data within the user profile as part of the digital conversion process.

12. The method of claim 10, wherein receiving the user profile comprises receiving, by the at least a processor, a historical user profile.

13. The method of claim 10, wherein converting the user profile to the digital model comprises generating, by the at least a processor, a representative user avatar.

14. The method of claim 10, wherein generating the programmed outline comprises:

training, by the at least a processor, a deep learning machine-learning model using enablement action training data, wherein the enablement action training data comprises a plurality of object enablement data and action data as input correlated to a plurality of proprietary sequences as output; and determining, by the at least a processor, at least one proprietary sequence as a function of the at least one classifier descriptor data tag using the trained deep learning machine-learning model to pair the current object enablement datum with at least a stored candidate object enablement datum.

15. The method of claim 10, wherein directing the user to the plurality of object enablement datum resources comprises:

searching, by the at least a processor, a database for a plurality of resource material or training opportunities with common classifier descriptor data tags;

prioritizing, by the at least a processor, the plurality of resource material and training opportunities based on a confidence score of the common classifier descriptor data tags; and displaying, by the at least a processor, the prioritized plurality of resource material and training opportunities.

16. The method of claim 10, wherein displaying the programmed outline and the plurality of object enablement datum resources comprises using machine-learning processes to dynamically modify, by the at least a processor, the user display based on historical object enablement data and user inputs.

17. The method of claim 10, wherein determining the at least an action datum from the plurality of action data within the programmed outline comprises optimizing, by the at least a processor, the at least an action datum as a function of a heuristic extrapolation using a Monte Carlo simulation.

18. The method of claim 10, wherein generating the programmed outline for the at least an object enablement datum comprises enabling, by the at least a processor, an interaction between the user and a virtual portal wherein the user reviews and queries specific options as summarized by a third party organization.

* * * * *